May 3, 1932.  G. MIQUEL ET AL  1,856,578
AEROPLANE
Filed May 5, 1930  6 Sheets-Sheet 1
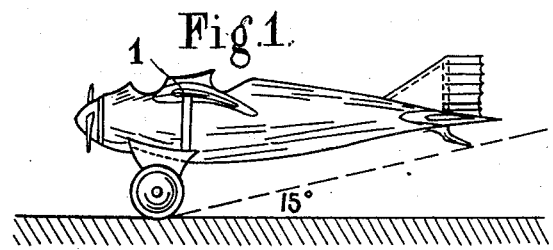
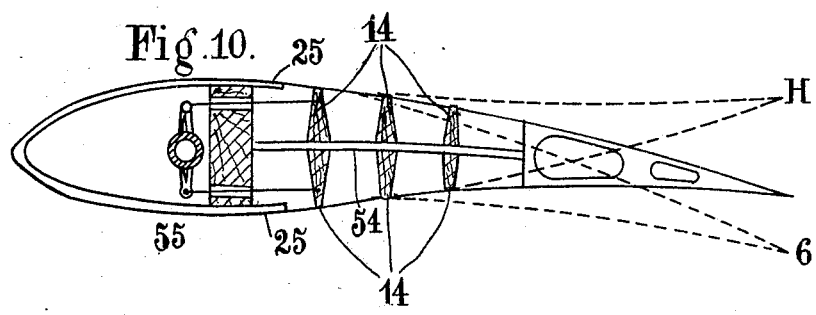
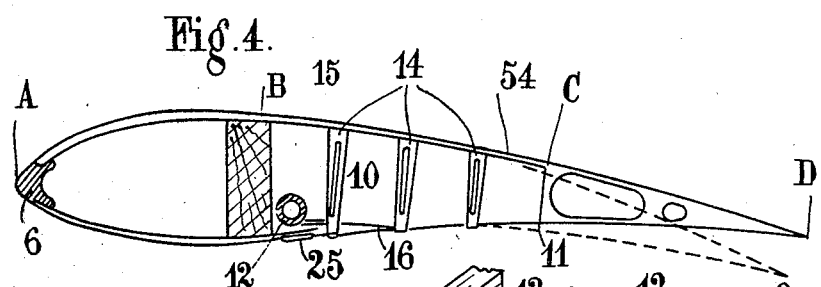
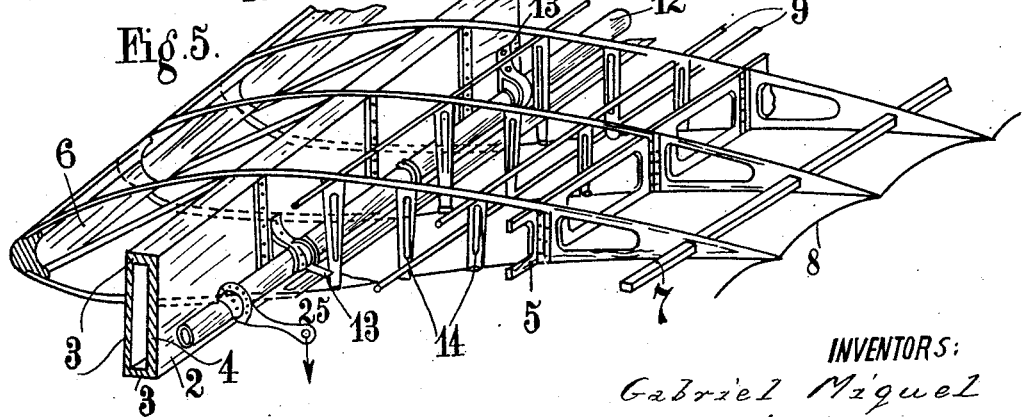
INVENTORS:
Gabriel Miquel
and Félix Latevege
By *[signature]*
ATTORNEY May 3, 1932.   G. MIQUEL ET AL   1,856,578
AEROPLANE
Filed May 5, 1930    6 Sheets-Sheet 2
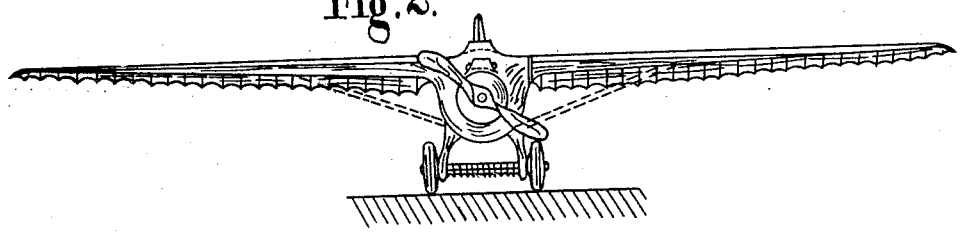
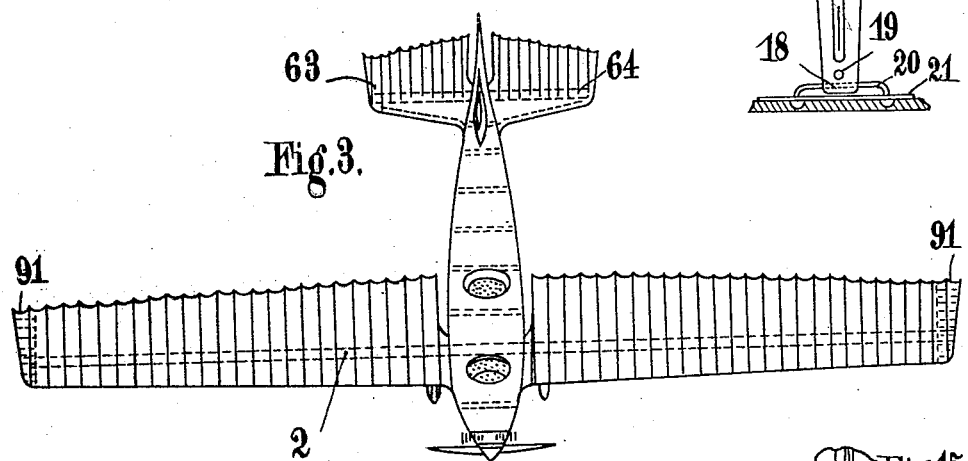
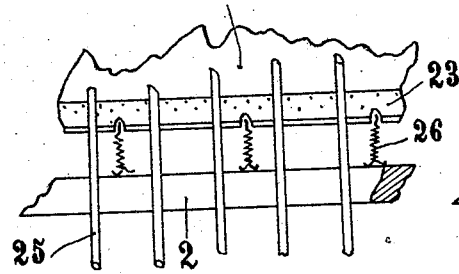
INVENTORS:
Gabriel Miquel
and Félix Ladeveze
By
ATTORNEY May 3, 1932.  G. MIQUEL ET AL  1,856,578
AEROPLANE
Filed May 5, 1930  6 Sheets-Sheet 3

INVENTORS:
Gabriel Miquel
and Félix Ladeveze
By [signature]
ATTORNEY

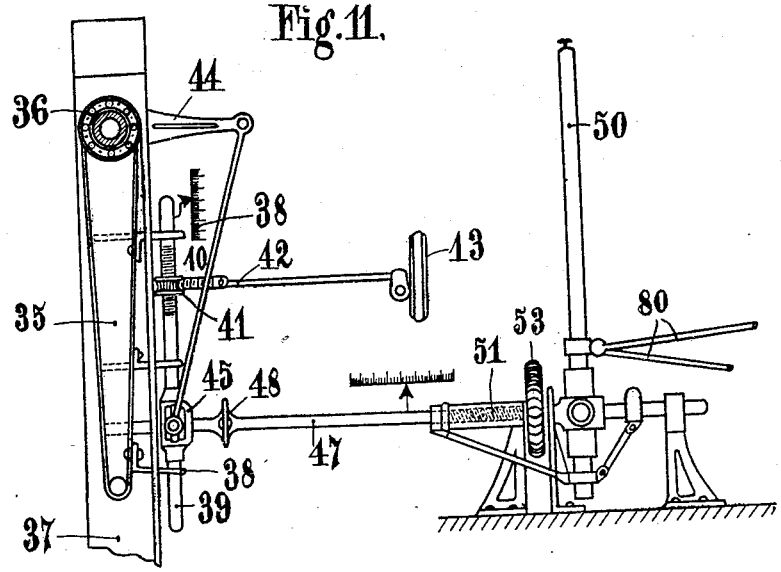
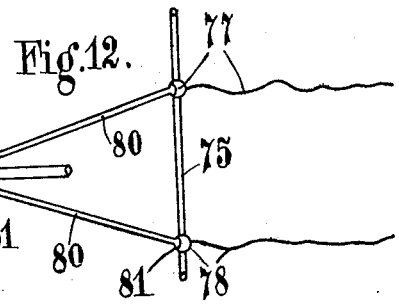
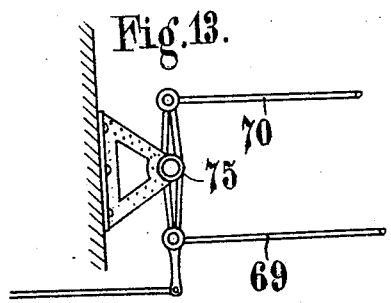

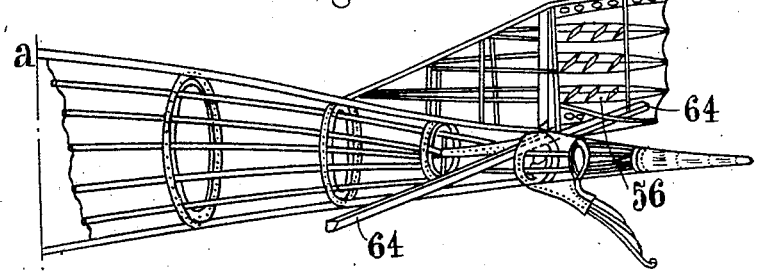
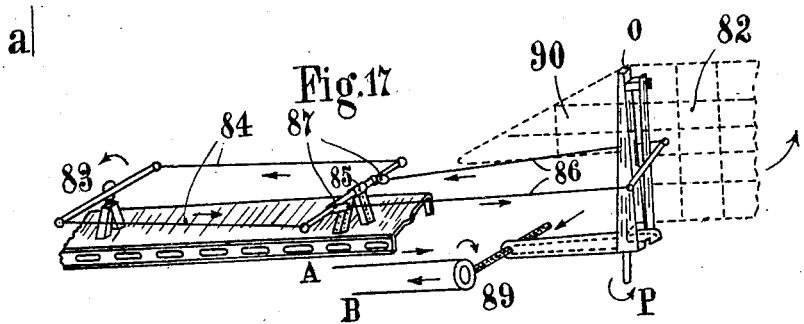
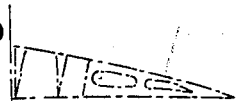
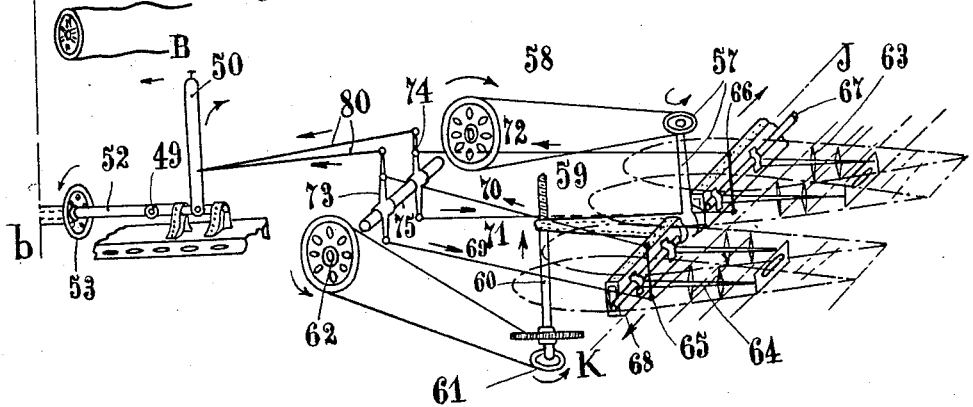

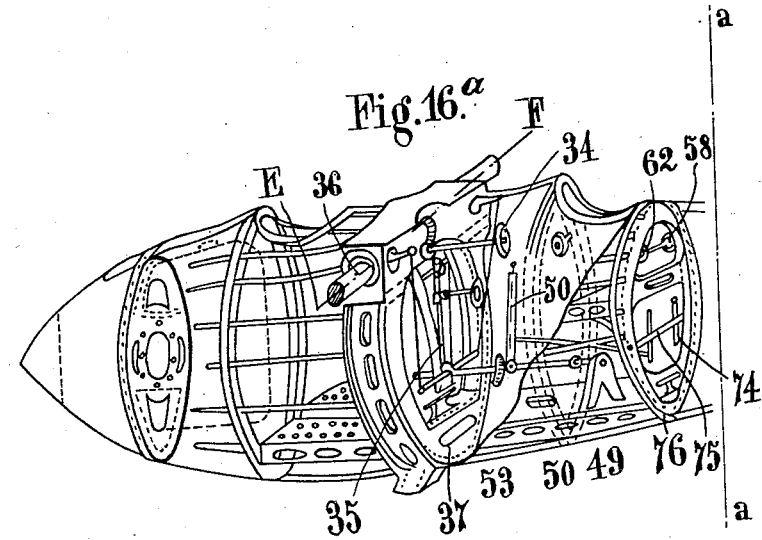
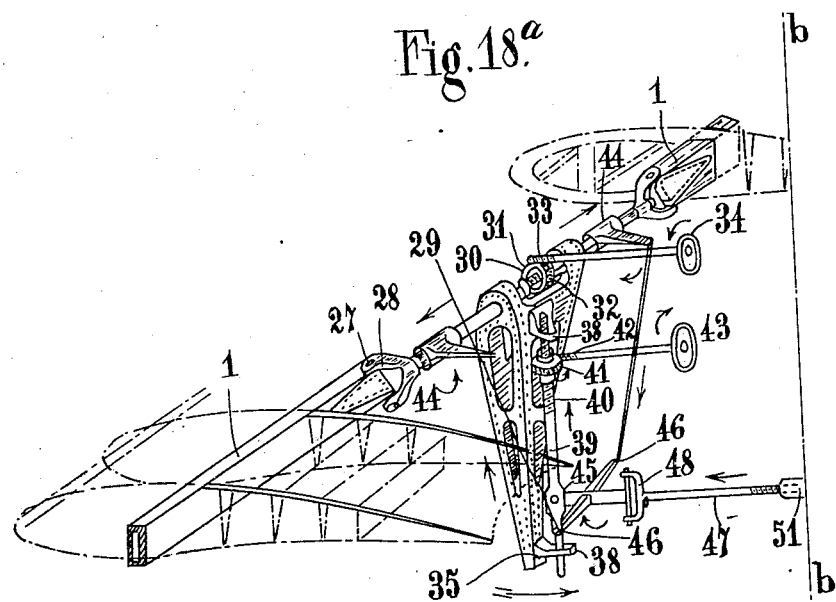

Patented May 3, 1932

1,856,578

UNITED STATES PATENT OFFICE

GABRIEL MIQUEL, OF RHEIMS, AND FÉLIX LADEVÈZE, OF PARIS, FRANCE

AEROPLANE

Application filed May 5, 1930, Serial No. 450,018, and in France May 15, 1929.

This invention has for its object an aeroplane which may be given any desired dimensions and power and in which the various arrangements embodied in it will enable the same to fly with the highest degree of safety at any desired speed or height and with maximum differences in speed and load.

This aeroplane, which is very easy to manage, is endowed with great stability on account of the wing being variable in curvature between a maximum and a minimum and also variable in incidence, whereby the wing may be set at any desired angle between a positive maximum and a negative maximum, which in turn allows the aeroplane to land at the lowest possible speed, say, eight to ten miles an hour.

The various qualities above referred to will allow a perfect and economical touring aeroplane to be produced in small dimensions.

The wings and vertical steering rudder are detachable in construction and may be folded by the pilot from his seat; this arrangement allows the aeroplane to be shedded readily and its bulkiness to be reduced to a minimum for transportation purposes.

The aeroplane may be of the monoplane, biplane or multiplane type without thereby interfering with the above mentioned qualities.

In order that the invention may more easily be understood, it will now be further described with the aid of the accompanying drawings wherein an embodiment of the various devices providing the subject matter of the invention is shown merely by way of example.

In the drawings:—

Figures 1, 2, 3 show the aeroplane in side view, front view and top plan view respectively.

Figure 4 shows the contour of the wing rib.

Figure 5 is a perspective view showing the arrangement of the ribs on the wing beam together with the actuating members for the same.

Figure 6 is a detail view showing the way in which the wing covering is secured.

Figure 7 is a detail view of the connection between the stationary and movable portions of the ribs.

Figure 10 shows the devices for controlling the shape of the ribs of the stabilizers and the horizontal steering rudder.

Figure 11 is a diagrammatical general view of the controlling members for the aeroplane.

Figures 12 and 13 show the linking for the control of the vertical steering rudders of stabilizers.

Figures 14 and 15 show two different ways in which the covering may be secured on the levers of the ribs.

Figure 8:
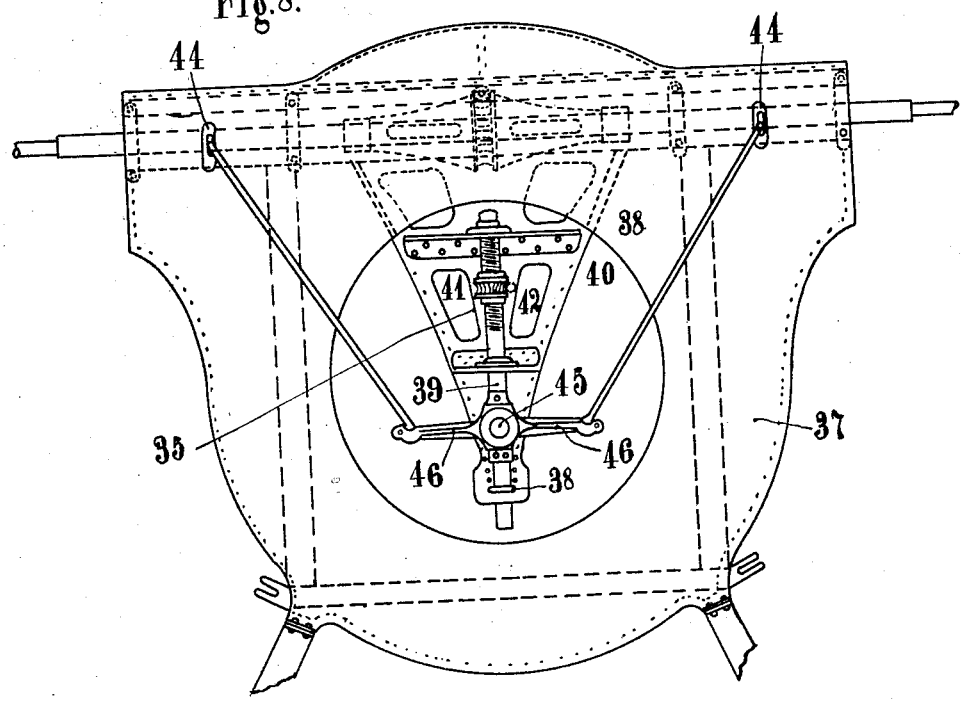
Figure 8 shows the wing securing member which also carries the machine control members and the wing curvature, setting, winding and folding devices.

Figures 16 and 16$^a$ are a perspective view of a fuselage equipped with the various controlling devices as indicated in the above.

Figure 17 is a view of the direction and drift correction members.

Figures 18 and 18$^a$ are diagrammatical general views of the machine controlling and adjusting members.

The principal elements constituting the aeroplane are the following:—

1. *The fuselage.*—(See Figs. 1, 2, 3 and 16). It is formed of ply-wood or metal casings assembled by means of four ash-wood longérons or four metal tubes; the fuselage may be covered with ply-wood or fabric or any suitable covering; the end casing supporting the stabilizer is provided with a duralumin frame.

2. *The wings.*—The wings 1 which may be of overhanging construction or provided with a bracing mast are trapezoid in shape and may be decidedly concave or flat according to whether they are set at maximum or minimum curvature.

The profile is decreasing from the fuselage towards the extremity, and of relative thickness.

3. *The wing beams.*—Each wing has only one beam rectilinear in shape and whose section is constantly proportional to the bending stress of the wing.

The beam 2 has the form of a chest formed of two treads 3 made of ash wood or of duralumin (Fig. 5) connected through two webs 4 made of ply wood and partitioned at various points therein.

An auxiliary beam 5 is used as a distance and stiffening member at the rear portion of the ribs.

No ailerons are provided in this type of aeroplane, as the winding of the wing is obtained by reversing the curvature change of the wings.

*The ribs.*—They are made of spruce or entirely of metal, the beam extending at about the first third of the rib length (Fig. 4); the distance between the ribs is maintained at the front portion thereof by a leading edge 6 made of hollowed wood or of metal tubing, at the rear portion thereof, by a distance rail 7 and a trailing edge cable 8; further, in the portion intermediate between both beams, by small duralumin tubes 9.

The portion intermediate between the leading edge 6 and the beam 2 is made of a framework covered with either ply wood or duralumin in order that a great stiffness may be given to the first third of the wing.

As may be seen on Fig. 4, the ribs are rigid only between A and B and between C and D.

The upper portion of the rib between B and C is flexible, which affords a change in curvature to be obtained in the following manner:—A cable 10 secured at one end to the rear framing 11 has its other end wound and secured on the tube 12 which itself is mounted in bearing members 13 (Fig. 5) secured to the beam; a suitable number of struts or props 14 are provided to maintain the flexible face 15 at the desired distance from the sliding face 16 which may be embodied as one member with the cable 10.

The said face or cable may be secured to the struts or props in various manners two of which are shown by way of example in Fig. 14 where a wood or metal sliding face is used and in Fig. 15 where a cable is employed.

According to Fig. 14, the strut consists of a strip 14 of duralumin which has a rib stamped in it to give a greater stiffness to the same; one or more rivets 19 are provided to prevent the latter from opening out while a metal yoke 20 slidably projects through the same and is secured at the ends thereof to a metal strip 21 by means of rivets.

According to Fig. 15, the construction of the strut is the same, but the metal strip 21 has riveted or welded thereto small sections of tubing or L-shaped ears 22 through which the cable 16 is passed, same likewise projecting through the face 21 and being secured in any desired manner, however at the lower portion of the frame C—D in order to provide for the continuousness of the wing intrados; at the other end there is secured a metal strip 23 (Figs. 6 and 7) which, acting as a clamp, secures one end of the fabric or covering 24, the said strip being slidably received in the guides provided therefor in each rib 25 (Figs. 7 and 16), thus stiffening the fabric or covering while allowing the ribs to be deformed; springs 26 secured on one hand to the metal face 23 and on the other hand to the beam 2 are adapted automatically to adjust the tension as the curvature is changed. The said springs may be replaced by an elastic strip.

Figure 9:
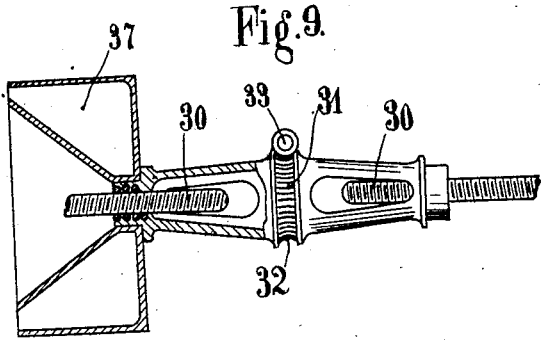
Figure 9 is a detail view of the wing and vertical steering rudder folding device.

The wings are secured to the fuselage by means of a pin 27 (Fig. 18), a head which is rigid with a steel tube 29 the end 30 of which is provided with a left hand thread for one wing and a right hand thread for the other wing (Figs. 9 and 10); a twin nut 31 rigid at its centre with a toothed pinion 32 which is imparted a rotary movement by a worm spindle 33 driven by a hand wheel 34 or any suitable member is adapted to drive the ends 30 of both wing pins, thus allowing the wings to be folded against the fuselage.

The structure just described is made longitudinally rigid with a frame 35 (Fig. 11) and the whole is suspended by means of a pair of ball bearings 36 (Figs. 11 to 16) or plain bearings at the center of the section or main casing 37, whereby the wings 1 may be rotated as a whole about the axis E—F (Fig. 16).

Secured to the frame 35 (Figs. 18 and 11) are a pair of supports 38 in which there is fitted for vertical sliding movement a shaft 39 which has a threaded end portion 40; a pinion acting as a nut and maintained in the vertical direction solid with the casing 35 provides for an ascending and descending movement of the rod 39 when the pinion 41 is set into rotation through the worm spindle 42 and hand wheel 43, which results in a swinging motion being imparted to the struts 44 about the axis of the wings 29.

The said struts through a suitable means control the curvature change of the aeroplane wings, the pin 45 rendering the struts 46 dependent on the vertical motion while the latter are operatively connected to the shaft 47 by a flexible gimbal joint 48, the whole being pivotally mounted on pin 49 which is secured longitudinally and is made rigid with the main control lever 50.

The shaft 47 is threaded at one end thereof and receives a nut 51 which being rigid with a shaft 52 while being adapted to freely rotate about the same and as it is set into rotation by means of the hand wheel 53 will produce an increase or a decrease in the distance from pin 49 to pin 45, thus causing the whole structure to rotate about the axis E—F (Fig. 16), which immediately results in an increase or a decrease in the angle of incidence of the aeroplane wings.

5. *Stabilizers.*—The construction of the stabilizers is similar to that of the wing ribs; it however differs from the latter by the fact that the flexible face 54 (Figs. 4 and 10) is located at the centre of the rib and the struts 14 or props are of twin construction and embrace the said face.

The control system is similar to that of the wings, but likewise of twin construction.

A control by means of struts 55 or by winding of the cable 12 as described above may also be provided; the said rib thus may take a curvature in the direction indicated at G/or in the direction indicated at H/, which results in an action similar to that of an ordinary rudder which would swing about an axis but has over the latter the advantage of a better penetration on account of the evenness of the contour and the suppression of whirls caused in ordinary cases by the sudden angle change and the voids existing in present systems, the consequence of which is a better efficiency and a gain in speed.

Moreover, the stabilizing rudders of this aeroplane may be wound, adjusted and folded from the pilot's seat. These various operations are performed in the following manner:—

The stabilizing rudders 63 and 64 (Fig. 18) are mounted on the frame 56 in the same manner as the wings, that is, by means of hinges and threaded pins.

The nut similar to nut 32 is actuated by the worm shaft and the pulley 57 which is controlled by means of a hand wheel arranged in the pilot's cabin; it allows the stabilizers to be folded; a frame 59 solid therewith allows them to be swung about the axis J—K by means of the worm shaft 60 which is actuated by means of the hand wheel 62.

Such system of control allows the vertical adjustment of the aeroplane flight.

The curvature of the ribs of stabilizers 63 and 64 is controlled separately for one or the other by means of the struts 65 and 66, the tubes 67 and 68 which themselves are controlled by cables or rods 69, 70, 71, 72.

These cables are secured to struts 73 and 74 which are pivoted on a pin 75 secured to the frame 76 (Fig. 16).

These struts 73 and 74 by means of a ring or the like may be moved towards or away from each other so as to vary the distance from the point on axis 77—78 (Fig. 12) to the axis of the main steering lever 50 to which the latter are secured through rods 80 provided with ball-and-socket joints 81.

The points of attachment of the cables 69, 70, 71, 72 may at will be varied in their distances to the pin 75 (Fig. 13) to allow the amplitude of the steering means to be adjusted.

6. *The horizontal steering rudder.*—The horizontal steering rudder 82 (Fig. 17) is constructed similarly to the stabilizers. It is formed of ribs with two curvatures (Fig. 10) and actuated by means of a two-arm foot lever 83; same through cables or tubes 84 is adapted to operate a secondary foot lever 85 to which there are linked the cables 84 which through a system similar to that for the stabilizers is adapted to control the curvature of the rudder.

The points of attachment 87 may be displaced to allow the amplitude of the steering rudder to be adjusted.

A hand wheel 88 (Fig. 18) arranged in the pilot's cabin allows through cables A and B (Figs. 17 and 18) to rotate a worm spindle 89 whereby a rotation of the plane 90 about the axis O—P is obtained.

This arrangement has for its purpose to allow the drift of the machine to be corrected.

The various parts of the machine may be of either wood or metal construction; the tips of the wings 91 (Fig. 3) may be provided with small ribs of similar construction to the steering planes and arranged laterally; same, as operated by a device within the reach of the pilot, will produce a lateral incidence whereby the control of the machine may be recovered should same happen to glide laterally.

Claims:

1. In an aeroplane, the combination of a fuselage; wings having means controlled by the pilot for varying the longitudinal curvature and for retaining said curvature; stabilizers having means controlled by the pilot for varying the longitudinal curvature and for retaining said curvature; and a steering rudder having means controlled by the pilot for varying the longitudinal curvature and for retaining said curvature.

2. The combination set forth in claim 1, wherein each wing comprises an inflexible front portion, an adjustable middle portion, and an inflexible end portion.

3. The combination set forth in claim 1, wherein each stabilizer comprises an inflexible front portion, an adjustable middle portion, and an inflexible end portion.

4. The combination set forth in claim 1, wherein the stabilizers may be varied in curvature either above or below their median position.

5. The combination set forth in claim 1, wherein the means for varying the curvature of the wings comprises a cable attached to a hand wheel positioned in the fuselage.

6. The combination set forth in claim 1, wherein the means for varying the curvature of the stabilizer comprises a cable attached to a hand wheel positioned in the fuselage.

7. The combination set forth in claim 1, wherein the wings are foldable against the fuselage.

8. The combination set forth in claim 1, comprising means for varying the curvature only of the lateral tips of the wings to suppress lateral gliding.

9. The combination set forth in claim 1, wherein the wings are separable from the fuselage.

10. The combination set forth in claim 1, wherein the wings are rotatable by means controlled by the pilot about a horizontal axis perpendicular to the axis of the fuselage.

11. The combination set forth in claim 1, wherein each wing comprises a hollow rectangular beam positioned at substantially the first third of the winged rib length.

In testimony whereof we affix our signatures.

GABRIEL MIQUEL.
FÉLIX LADEVÈZE.